Oct. 11, 1960        F. E. NULL ET AL        2,955,777

INFRA-RED TELEVISION DETECTOR AND CONTROLLER

Filed Aug. 19, 1946        7 Sheets-Sheet 1

INVENTORS.
FAY E. NULL
WILLIAM D. ADAMS
BY *Mdr Koontz* AND
*Chester Tietig*
ATTORNEYS

Oct. 11, 1960  F. E. NULL ET AL  2,955,777
INFRA-RED TELEVISION DETECTOR AND CONTROLLER
Filed Aug. 19, 1946  7 Sheets-Sheet 2

INVENTORS
FAY E. NULL
WILLIAM D. ADAMS
ATTORNEYS

FIG. 15.

United States Patent Office 2,955,777
Patented Oct. 11, 1960

2,955,777

INFRA-RED TELEVISION DETECTOR AND CONTROLLER

Fay E. Null, 2008 Oakridge Drive, Dayton, Ohio, and William D. Adams, 4737 Drexel Blvd., Chicago, Ill.

Filed Aug. 19, 1946, Ser. No. 691,647

15 Claims. (Cl. 244—14)

(Granted under Title 35, U.S. Code (1952), sec. 266)

The invention described herein may be manufactured and used by or for the Government for governmental purposes without the payment to us of any royalty thereon.

This invention relates to an electronic, infra-red ray actuated system, the purpose of which is to direct an airborne military missile using the system to a target which emits comparatively strong infra-red or heat waves. The system is intended to permit the missile to be optionally controlled, either automatically by apparatus contained within the missile itself, or remotely by radio signal. Remote control over the missile may be exercised from a control station on the ground or in a mother aircraft from which the missile may have been launched, by a human operator who has presented before him upon a television screen the view before the nose of the missile in flight.

The objects of the invention comprise the provision of a compact, electronic system which minimizes the common effects of enemy radio interference ("jamming") by being changeable from a remote point from automatic to remote control and the reverse.

Another object is the utilization of an improved infrared sensitive mosaic described and claimed in our copending application Serial No. 691,648, filed August 19, 1946, for Mosaic. The advantages of the infra-red sensitive mosaic are fully set forth in the copending application.

A further object is the provision of a missile guiding, remote control system adapted for operator control of an airborne missile from a control station within another aircraft or from a ground station in which the human operator may select a target from among several which he may observe upon a television screen before him as a result of observations gathered by the improved mosaic that preferably is disposed in the nose of the missile.

Other objects are the provision of means for governing the operation of servo systems and the like, whereby a desired plurality of controls on the missile are actuated automatically or from the remote station. Such controls on the missile are actuated proportionally in accordance with the signal received. This is an improvement upon other known proportional control systems, or upon older conventional systems which operate on the "all or nothing" principle, wherein a "right" signal would place the rudder all the way right and a "left" signal would place the rudder all the way left. According to the proportional control in this invention, the "right" signal would be applied in proportion to a predetermined amount that the rudder would be turned to maintain the flight course of the missile directed most effectively toward the target. This system has the virtue of substantially eliminating "hunting" and adds greatly to the accuracy of directed flight.

In the present invention, the system approaches a television arrangement. It is another object of the invention to provide an improved convenient and advantageous use of a television receiver and kinescope for identifying heat targets in front of the missile from a point that is remote from the missile. It is also an object to provide cursor and sighting means traversable over the face of the kinescope screen to enable the human operator to select and direct the missile toward the desired target from among others which may simultaneously appear. It is an object to combine with said cursor and sighting means, other means which will enable the operator at the same time and by the same operation to introduce a voltage displacement into the proportional servo control system necessary for the missile to be directed exactly onto the target.

The greatest benefits of the improved form of proportional control that is disclosed herein are realized at the high rates of turn occurring when a rocket propelled missile approaches a fast moving target. As the rate of closure increases, the control deflection must increase. Proportional control, as operating in this device on automatic control, takes into consideration the angular deviation of the longitudinal axis of the missile and the optical axis of the target's point in space with respect to the missile. The change in the angular rate determines the torque that is required to bring the missile back on course. This torque, or proportionality factor, is introduced directly to the servo mechanism, thus producing a change in the rate of turn proportional to the deviation of the missile's longitudinal axis with respect to a straight line to the target.

A further object is to provide a missile control where the missile is rocket propelled to a super-sonic speed and is adapted for overtaking a jet propelled aircraft at speeds of turning and tracking the target aircraft that are prohibitive for the older types of missile control. Important benefits flow from the improved form of proportional control that is disclosed herein when consideration is given to the rapid rates of turn that are necessary when a rocket propelled missile approaches a fast moving target. As the rate of closure increases, the control deflection may be called upon to increase also. In conformity with the operation of the systems that are disclosed herein, when the missile is on automatic control, consideration is made for the angular deviation of the longitudinal axis of the missile and the optical axis of the target's point in space with respect to the missile. The change in the angular rate determines the torque that is required to bring the missile back on course when the target goes into evasive action. This torque or proportional factor is induced directly to the servo mechanism, thereby producing a change in the rate of turn of the missile that is proportional to the deviation of the longitudinal axis of the missile with respect to a straight line to the target.

With the above and other objects in view which will be apparent from the following description, an illustrative embodiment of the present invention is shown in the accompanying drawings wherein.

The electronic system that forms the subject matter of the present invention and that is illustrated in the accompanying drawings, comprises broadly a plurality of interoperating radio circuits for operating a desired plurality of controls at a controlled station, such as for directing the flight course of an airborne missile 18 toward its target, automatically or interchangeably by remote control.

Figure 5:
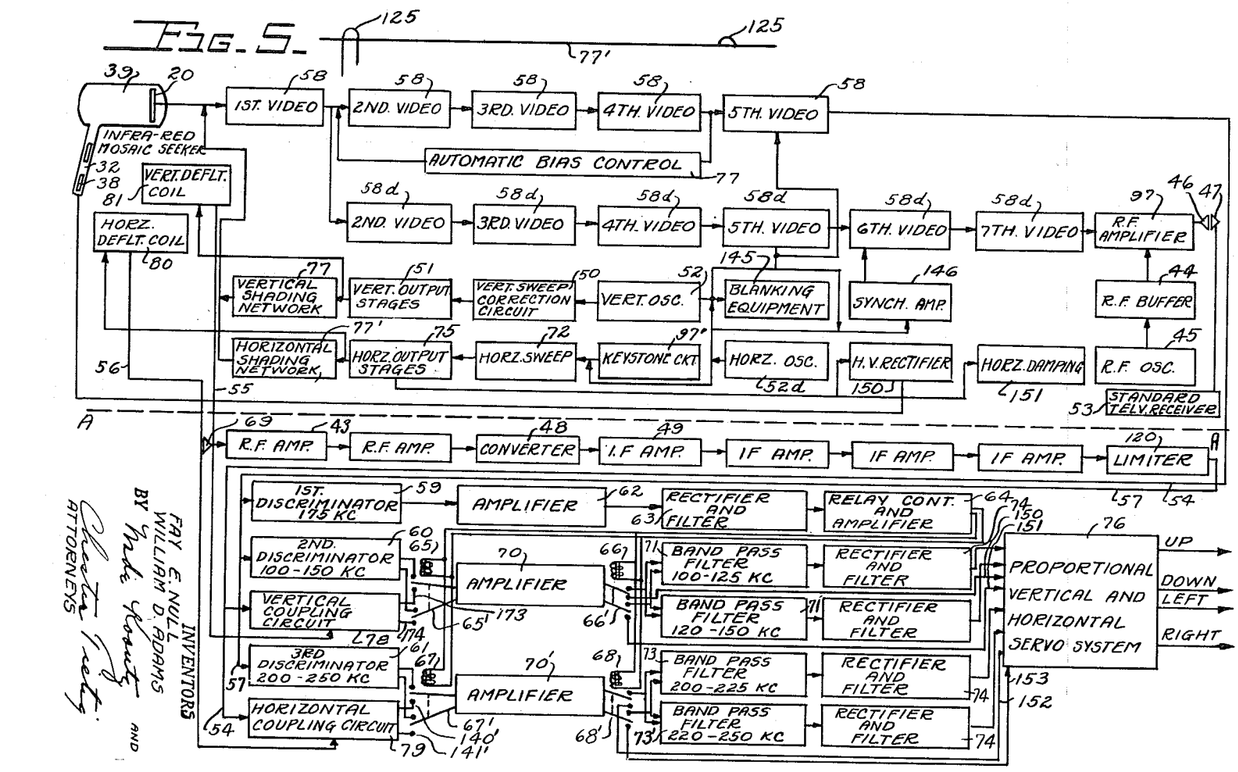
Fig. 5 is a block diagram of the electrical circuit of the contemplated device comprising an automatic channel and a remote control channel operable interchangeably for directing the flight course of the missile housing the circuit.
Figure 12:
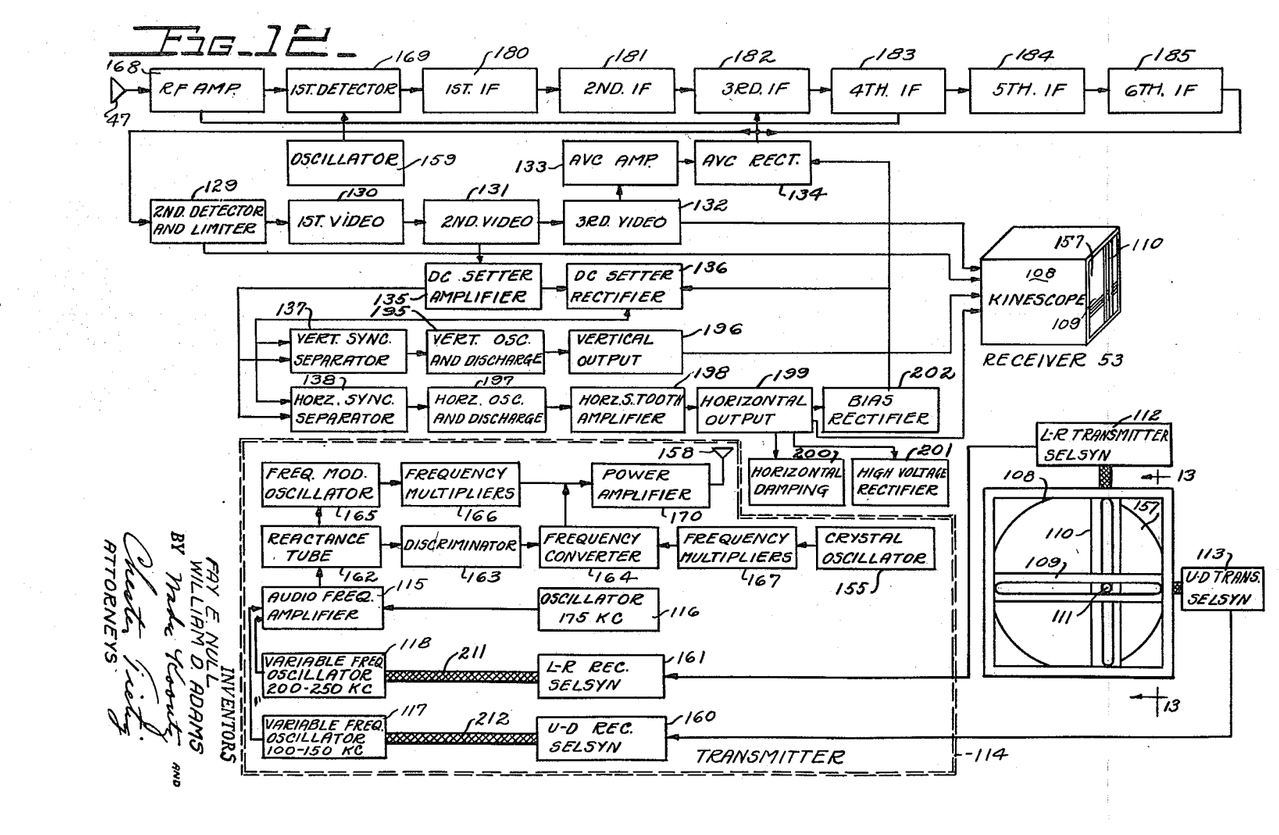
Fig. 12 is a block circuit diagram of a receiving and transmitting circuit at a control television station with means for directing the flight course of and operating controls upon a missile containing the circuit shown in Fig. 5.
Figure 15:
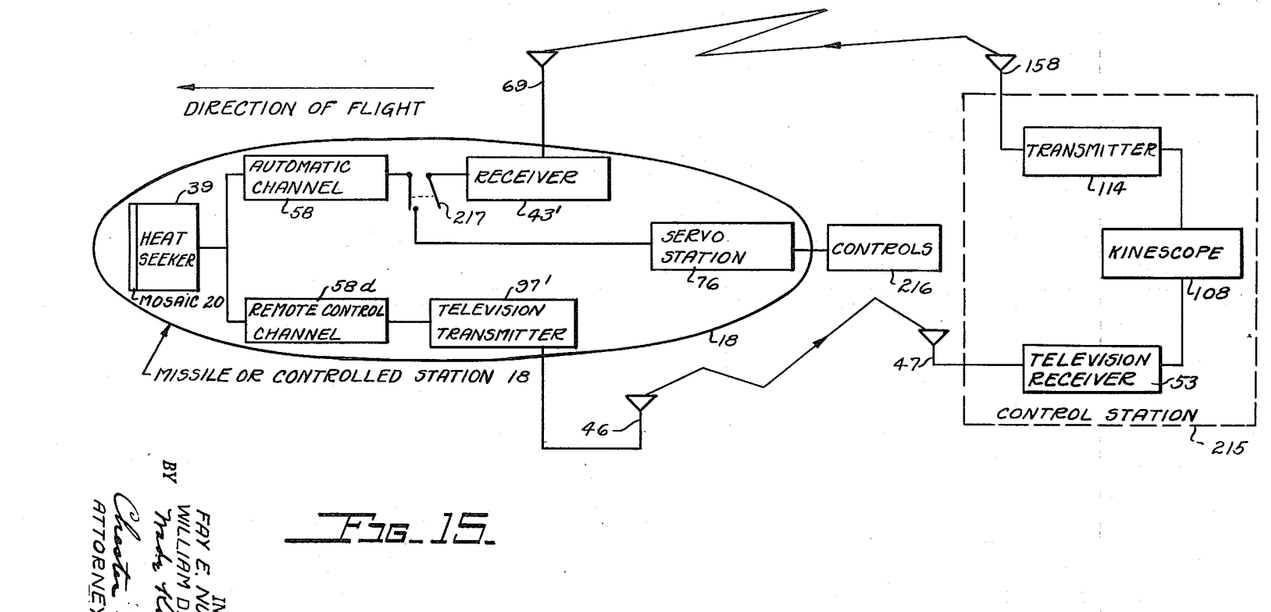
Fig. 15 is a simplified block diagram of the missile and control station circuits and association.

The details of a mosaic 20, part of the system that is disposed within an infra-red heat seeker 39 mounted in the nose of the missile, are shown in Figs. 1 to 4 of the drawings. In Figs. 5 and 15 of the drawings, the circuit that is disposed within the airborne missile 18 and that selectively controls its flight course automatically or by remote control from a distant control station 215 is shown. In Figs. 12 and 15 of the drawings are shown circuits at the remote control station 215 and specifically a receiving circuit 53 wherein a television presentation from the nose of the missile 18 is displayed upon the screen of a kinescope 108. The circuit of a transmitter 114 remotely controlling the flight course of the missile 18 from the remote control station 215 is also shown in Figs. 12 and 15. The other views presented in the drawings are details of portions of the circuits and components therein that are shown elsewhere in the drawings.

*Mosaic structure*

In the first four figures of the accompanying drawings, a back plate 24 serves as a mount for the mosaic assembly and is preferably of copper or other electrical conducting material. An insulation sheet 27 is disposed upon and is secured to one side of the back plate 24, leaving a suitable margin between adjacent edges thereof for making electrical connections to parts of the mosaic. The insulation sheet 27 preferably is a thin sheet of mica suitably cemented to the metal back plate 24.

Figure 1:
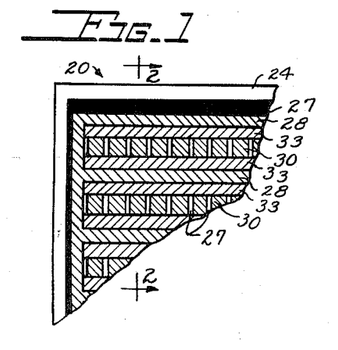
Fig. 1 is a fragmentary front elevation of the mosaic cell used for thermal detection.
Figure 2:
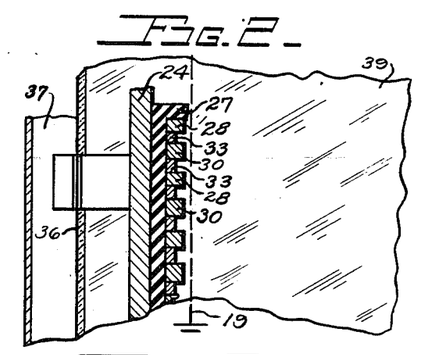
Fig. 2 is a sectional view taken along the line 2—2 of Fig. 1.
Figures 3, 4:
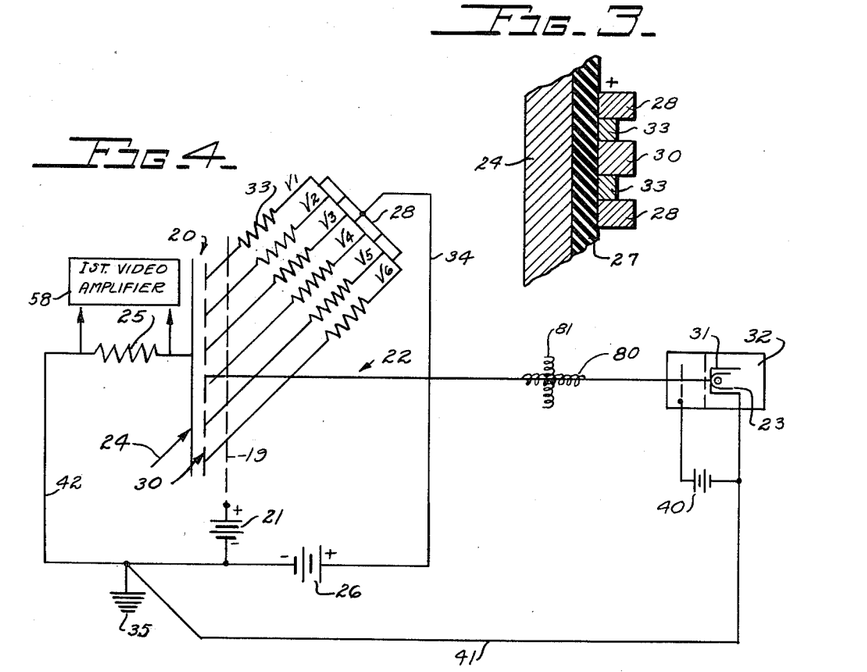
Fig. 3 is an enlarged fragmentary view of Fig. 2 showing a positive electrical charge on a grid of the mosaic.
Fig. 4 is a schematic electrical diagram of a circuit for scanning the mosaic.

In making of the mosaic, there is disposed upon the insulation plate 27 through a mica stencil, not shown, by any suitable process of manufacture, a strip layer of photosensitive material 33 which preferably is lead sulphide, the vapors of which have been diluted with a few percent of pure oxygen. The material 33 contains a small proportion of oxygen. This photo-sensitive material 33 has the property of becoming more conductive under the influence of heat or infra-red rays than at low temperature. When heated, it conducts positive charge from grid 28 to condenser plates 30. The lead sulphide deposit of photo-sensitive material 33 is applied to the insulation material 27 and preferably is disposed horizontally in strip form, the individual strips extending from inwardly of one margin of the insulation material 27 to inwardly of the other margin thereof so that the lead sulphide is insulated from the back plate 24. Above and downwardly beyond the ends of the uppermost strip of photosensitive material 33 a strip of positively charged grid 28 of gold or platinum is disposed upon the insulating material 27 by evaporation, sputtering or the like. Below the uppermost strip of photo-sensitive material 33, there is a series of small substantially square condenser plates 30 extending along a horizontally disposed row. The condenser plates 30 also are applied to the insulation material 27 by the evaporation or sputtering of gold or platinum. Air gaps separate the condenser plates 30 from each other. Electrical contact is made between the positive grid 28 and the condenser plates 30 by the photo-sensitive material 33. The photo-sensitive material 33 is electrically highly resistant at low temperatures and is locally conductive when a hot spot or localized infra-red energy is applied to the face of the mosaic 20.

Figure 10:
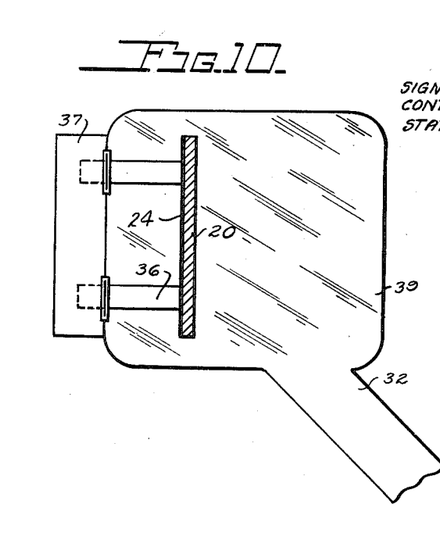
Fig. 10 is a side elevation of the heat seeker tube, somewhat conventionalized, showing the mosaic cell mounted therein and, attached to the tube, a pan for holding Dry Ice which maintains the mosaic cell at a low temperature, i.e., −70° C.

Below the uppermost row of condenser plates 30 there is another strip of lead sulphide material 33 deposited and below that another strip of positively charged grid 28 of gold that is continuous along the lateral edges of the structure, as shown. This structure is repeated throughout the face of the mosaic 20, as shown in Figs. 1–3, inclusive, of the accompanying drawings. There are preferably not less than four hundred combinations of elements 28, 33 and 30, or there should be at least four hundred condenser plates 30 carried by the back-plate 24 with the mica insulation 27 therebetween. As a matter of dimensions, it has been found that each of the condenser plates 30 may be about one millimeter square. The other elements may be of proportionate size as indicated on the drawings. For the proper guidance of a missile, the optical system of a heat seeker 39 shown in Figs. 5, 10, and 15, in which the mosaic 20 is mounted, should be of sufficiently short focal length to cover 20° of the field of view, both vertically and horizontally, or subtend a solid angle of 20°.

In the event the airborne missile is flying toward a target that emits materially greater heat than surrounding heat sources, that are hereinafter referred to as background heat sources, one spot upon the mosaic 20 will receive a higher degree of heat than the remainder of the mosaic 20.

The function of the three element combination just described is as follows: Upon receiving heat signal, the strips of lead sulphide material 33 conduct more positive charges from grid 28 to condenser plates 30. Condenser plates 30 thereby acquire a positive charge from the increased conductivity of the material 33. The increase in conductivity is proportional to the intensity of the heat that is applied to the mosaic. An electrical picture of any outstanding heat signal is therefore developed in the form of electrical charge upon one or more of the condenser plates 30 nearest the hot spot on the mosaic by highly localized conduction from the positively charged grid through the material 33 to the condenser plates 30. Back plate 24 forms the other plate of the condenser and the mica sheet 27 the dielectric therebetween.

Figures 8, 11, 13, 14:
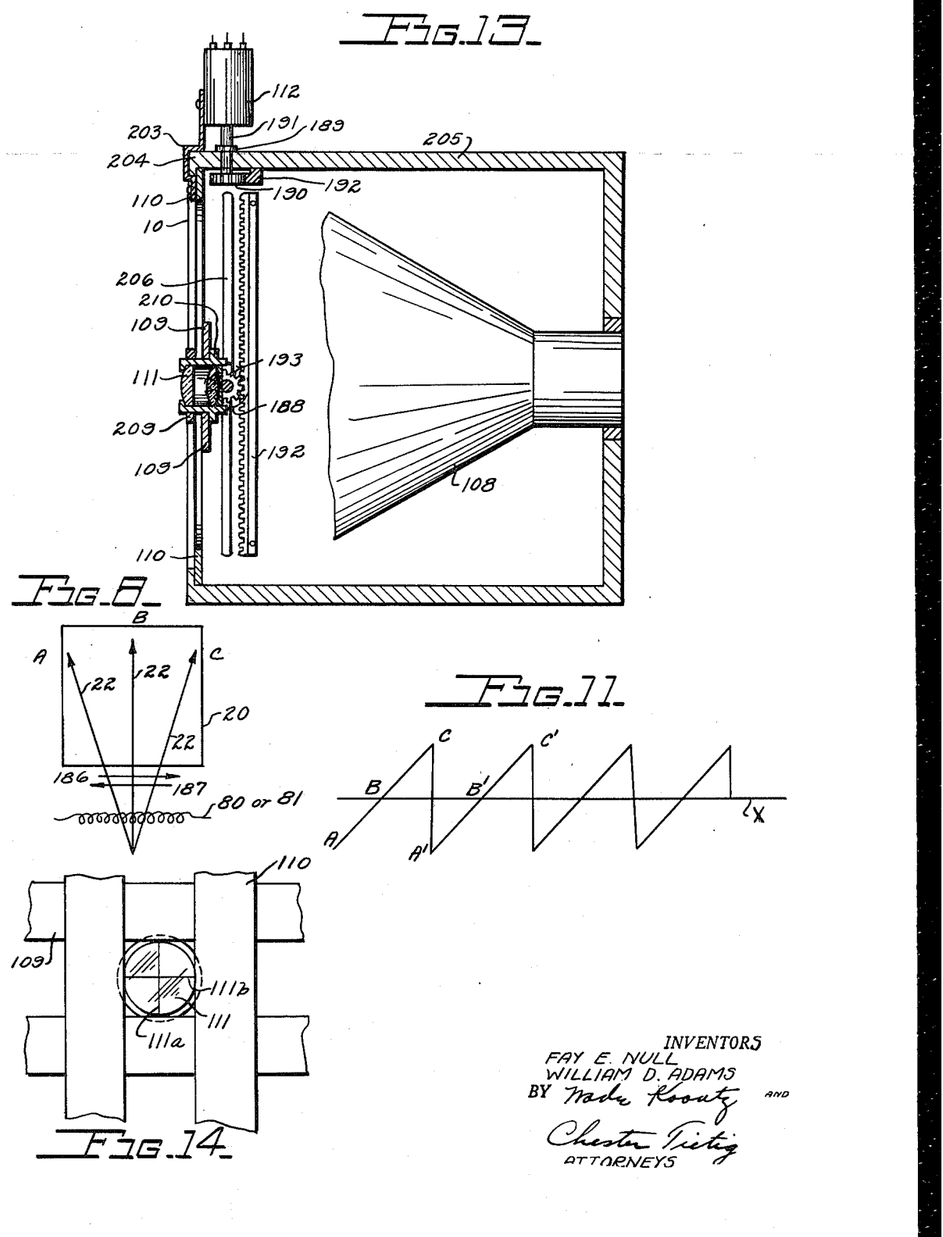
Fig. 8 is a diagram which shows the scanning action of the cathode ray beam as it scans the mosaic.
Fig. 11 is a diagram showing the voltage characteristics of the current which governs the scanning action of the cathode ray beam.
Fig. 13 is a vertical cross section partly fragmentary of a kinescope mounting employed at the remote control station for directing the missile by remote control through the action of cursors, taken substantially along the line 13—13 of Fig. 12.
Fig. 14 is an enlarged fragmentary detail in front elevation of the mounting of a sighting lens on the kinescope cursors.

As shown in Figs. 4 and 8 of the drawings, an electron beam 22 is driven in a scan from the cathode 23 of an electron gun 32. A battery 40 has its negative terminal applied to the electron gun cathode 23 and its positive terminal to an aperture plate for focusing the electron beam 22. The electron beam 22 is directed and controlled in its scanning operation in usual manner by vertical deflector coil 81 and horizontal deflecting coil 80.

Figure 7:
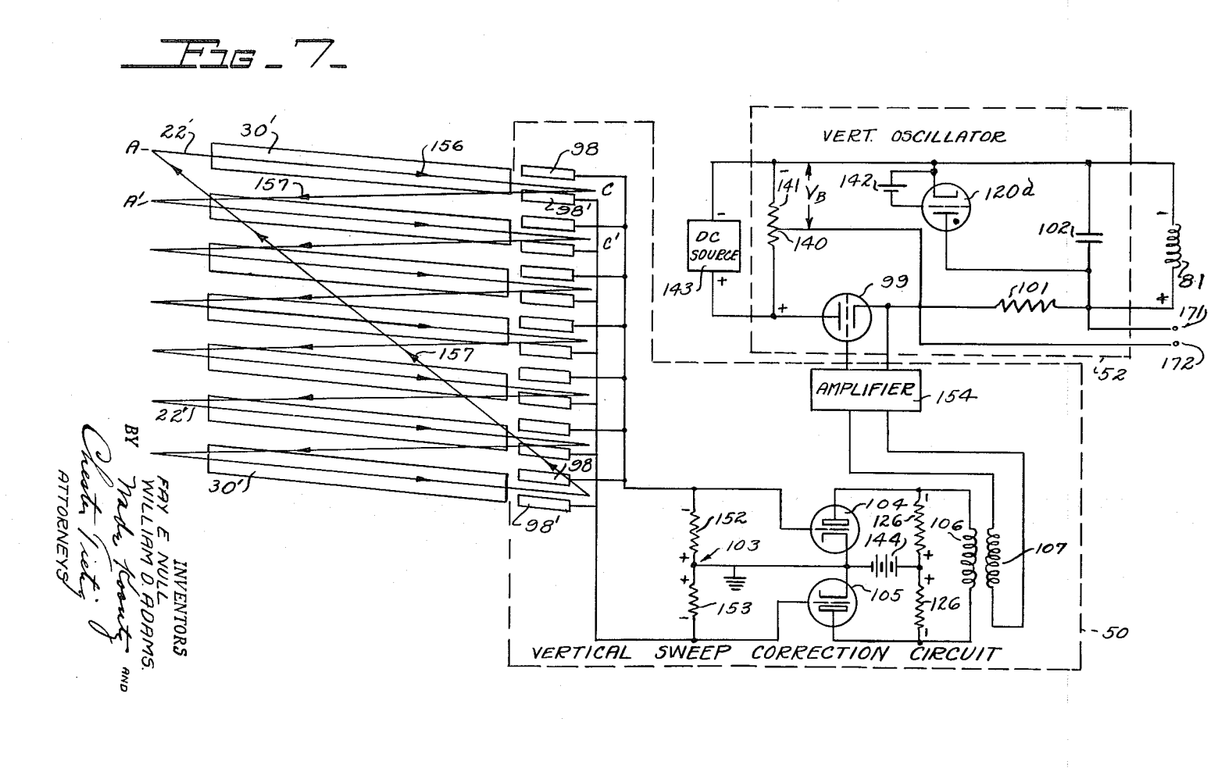
Fig. 7 is a schematic circuit diagram showing details of the vertical sweep correction circuit of Fig. 5.

The condenser plates 30 may be scanned by the electron beam 22, see Figs. 4, 7, and 8, without injury. To scan the lead sulphide material 33 directly would decrease its sensitiveness. The beam 22, in scanning the rows of condenser plates 30, brings the potential of each one in turn equal to that of the cathode 23 from which the scanning beam originates.

Electrons are deflected from the plates 30 and these must be caught before they drift to as yet undischarged condenser plates 30 and partially discharge them before the scanning electron beam 22 discharges them. A collecting screen 19 bearing a small positive charge is provided for this purpose. The screen 19 is disposed over the face of the whole mosaic 20 and is penetrated by the scanning beam 22. It should not be so fine as to interfere with the action of the beam 22. The distance between the screen 19 and the mosaic 20 is only a few millimeters. A second function of the screen 19 is to assist in keeping the face of the mosaic cool. The lead sulphide photo-sensitive material 33 is sensitive at the temperature of Dry Ice.

A preferred source of cooling the mosaic 20 is a filling of Dry Ice (not shown) contained in a pan 37 mounted upon the rear side of the back plate 24 (see Fig. 2). The pan 37 is attached by any suitable mechanical fastener to one or more bus bars 36 which extend from the back plate 24 of the mosaic 20 through a glass envelope of heat seeker 39 which houses the mosaic. Any other provision for cooling the mosaic may be substituted if it is reasonably compact and preferably can keep the mosaic at least as cold as −70° C.

A preferred scanning circuit is shown in Fig. 4 wherein $V_1$ and $V_6$, inclusive, shown as resistances, are successive rows of lead sulphide photosensitive material 33 on the mosaic. Vertical and horizontal deflecting coils 81 and 80, respectively, deflect the electron beam 22 in a usual scanning operation. The beam is shown passing through the screen grid or collector screen 19 which is charged positively by being connected to the positive terminal of a battery 21. A second battery 26 is provided to render positive the grid 28. A positive terminal of the battery 26 is connected by lead 34 to the positive grid 28, which comprises a plurality of strips connected in parallel across the face of the grid and at the strip ends. The negative terminal of the battery 26 and the negative terminal of the battery 21 are lead to ground 35. A third battery 40 provides focusing of the electron beam 22 from the cathode 31 within the electron gun 32. A lead 41 grounds the negative side of battery 40 and cathode 31 to ground 35.

A pick off resistor 25 is connected to the mosaic by its back plate 24. A lead 42 grounds the resistor 25 at 35. A capacitor charging circuit is therefore completed from battery 26 through the mosaic 20 and the resistor 25 to ground. Another circuit extends from the battery 21 to collector screen 19, to the electron beam 22, thence to ground 35. By the operation of this latter circuit, the electrons splashed from the condenser plates 30 are collected on the screen 19 and are passed through the battery 21 to ground.

A discharge capacitor circuit is formed from condenser plates 30 to the electron beam 22, to the cathode 31 in the electron gun 32, thence to ground 35, completing the circuit through the pick off resistor 25 and the mosaic back plate 24. The current of the battery 26 is available to charge the condenser plates 30, the discharge of these condenser elements giving the IR drop which acts as a signal across the ends of the resistor 25. The signal emission direction is indicated on the drawings as a pair of arrows extending from the ends of the resistor 25. The signal 125, is applied to the first video amplifier 58, as indicated in Fig. 5. Since the mosaic is essentially a condenser, it blocks the passage of direct current through it.

Mosaic operation

The electrical action may be described as follows: When the most effective infrared energy strikes one of the photo-sensitive material resistances such as $V_1$, then that condenser plate 30 to which resistance $V_1$ is most nearly connected, is charged from the grid 28 by increased conduction of the material 33 more positively than the others during the interval between scans. When the scanning electron beam 22 passes over the most highly positively charged plate 30, the largest pickoff voltage is obtained across the resistor 25 and is applied to the first video amplifier 58. At each passage of the electron beam 22 over a condenser plate 30, that plate is discharged and brought substantially to the potential of the cathode 31. It is important that a small, sharply focused scanning spot be applied to the condenser plates 30 so that bombardment of and resultant desensitization of the photo-sensitive material 33 is minimized. Sweep correction plates 98 and 98′ for maintaining accurate scans are shown in operative combination with the present mosaic 20 in the sweep correction circuit shown in Fig. 7. The advantages and operation of the sweep correction plates 98 and 98′ will be presented subsequently in connection with the description of the sweep correction circuit.

Missile circuits

The circuit as shown in Fig. 5, with the exception of a television receiver 53 and its antenna 47, is contained within and directs the flight course of the airborne missile 18. The details of the television receiver 53 and a transmitter 114 that is associated with the receiver 53, are shown in Fig. 12 of the drawings and are positioned at a control station that is remote from the missile.

Signal from the mosaic 20 in the infra-red heat seeker 39 is of irregular pattern and is applied to both an automatic control channel and to a remote control channel that stem in parallel from the mosaic 20 with the 1st of a desired plurality of video amplifiers 58 common to both channels. Signal from the mosaic 20 that is applied to the automatic channel is biased by an automatic bias control 77 to a grid bias level indicated by the line 77′. The automatic bias control 77 shunts the 2nd to 4th video amplifiers 58, inclusive. The automatic bias control 77 operates in such a manner that only a maximum heat or target signal 125 is conducted into the 5th video amplifier 58 of the automatic control channel and therefore directs the flight course of the missile. The bias indicated by the line 77′ is placed at the approximate upper level of background heat, as applied to the mosaic 20, so that a heat source of outstanding intensity and strength, such as heat from the type of military target being considered herein, will be isolated from the background heat sources by the automatic bias control 77 and will appear as target signal 125 with each complete sweep of the mosaic 20 by the electron beam 22. The automatic control channel begins with the 1st through the 5th of the video amplifiers 58 and continues to the vertical coupling circuit 78 and the horizontal coupling circuit 79, where it is subjected to the effect of the settings of ganged pairs of switches 65′ and 67′, respectively.

Switches 65′ and 67′, as well as ganged pairs of switches 66′ and 68′, are spring pressed downwardly and are so disposed when relay windings 65, 67, 66 and 68 are deenergized by absence of signal of 175 kc. frequency from the control station. With the switches 65′, 67′ and 66′ and 68′ closed downwardly, automatic channel signal is conducted through amplifiers 70 and 70′ and applied through leads 150, 151, 152 and 153 the two latter in Fig. 5 shown in Fig. 7 as resistors to a servo system 76 that controls the flight course of the missile directionally and proportionally as determined by the position and magnitude, respectively, of the hottest spot on the mosaic 20, as will be more fully developed hereinafter in connection with further description of the circuits involved.

All heat response signals from both the target and from its background heat sources are supplied to and transmitted by the remote control channel shown in Fig. 5, comprising the 2nd to 7th video amplifiers 58d, and are transmitted undeleted to the control station shown in Fig. 12. It is from these heat presentations upon the screen 157 of the kinescope 108 that an operator selects the target and, by controlling the disposition of the two cursors 109 and 110 upon the screen 157, is able to sight cross hairs 111a and 111b in the lens 111 directly upon the target or upon a selected portion of the target at which he wishes the missile 18 to strike.

The remote control channel opens at the same 1st video amplifier 58 as does the automatic channel and continues through the 2nd to 7th video amplifiers 58d. The output from the 7th video amplifier 58d is combined in a radio frequency amplifier 97 with the output of radio frequency oscillator 45 after passing through buffer 44 and is broadcast from transmitting antenna 46 to a control station such as that indicated in Fig. 12 of the drawings. Remote control channel signal from transmitting antenna 46 on the missile 18, Fig. 15, is radiated to receiving antenna 47 of a television receiver 53 at the control station 215 where it causes the television presentation of the view from the mosaic 20 in the nose of the missile to be displayed upon the screen 157 of a kinescope 108. An operator at the kinescope, in a manner to be more fully developed hereinafter in connection with the description of Fig. 12, transmits frequency modulated signals from transmitter 114 and radiated from transmitting antenna 158 for controlling remotely the flight course of the missile 18.

Missile flight course controlling signal from the remote controlling station 215 disposed within an aircraft or at a ground station and having a preferred circuit shown in Fig. 12, is radiated from antenna 158 thereat. The signal from the control station 215 is intercepted by the antenna 69 shown in Fig. 5, for effecting remote control over the missile 18 that is equipped with the circuit that is shown in Fig. 5. Remote control RF signal that is received at the antenna 69 is applied to one or more radio frequency amplifiers 43, passed to the converter 48, where it is converted into IF signal, fed to a desired plurality of IF amplifiers 49 and applied to a limiter 120. The output of the limiter 120 is passed over a conductor 57 and is applied in parallel to a first discriminator 59, to a second discriminator 60 and to a third discriminator 61.

The first discriminator 59 passes signal of 175 kc. for closing relays and completing connections; the second discriminator 60 passes signal within the band from 100 to 150 kc. for causing the missile to change altitude; and the third discriminator 61 passes signal within the band from 200 to 250 kc. for causing the missile to change azimuth; as operational examples. Additional discriminators with their associated circuits may be added for accomplishing functions if desired. The output from the first discriminator 59 is passed successively to the amplifier 62, rectifier and filter 63, and to the relay control and amplifier 64, the output of which causes the energization of a pair of relay windings designated for functional clarity by the numerals 65—66 and 67—68. In the absence of signal of 175 kc. waves the relay windings are deenergized and the missile continues to fly on automatic control. The energization of the relay windings 65—66 and 67—68 closes the relay switches 65'—66' and 67'—68' upwardly against yielding spring pressure so that the output from the second discriminator 60 is applied to the amplifier 70 and the output from the third discriminator 61 is applied to the amplifier 70'. The energization of the relay winding 66 causes the pair of output switches 66' from the amplifier 70 to be closed upwardly, thereby preparing the circuit for the application of signal within the band from 100 to 150 kc. in parallel to the band pass filter 71 and to the band pass filter 71'. The band pass filter 71 passes signal within the band from 100 to 125 kc. and the band pass filter 71' passes signal within the band 120 to 150 kc. The 5 kc. frequency overlap insures smooth operation. The output from the band pass filter 71 is passed through the rectifier and filter 74 and is applied to an altitude servomotor, not shown, within the proportional vertical and horizontal servo system 76 to cause an increase in the altitude of the missile within which the circuit shown in Fig. 5 is disposed, as indicated by the arrow designated "Up." Signal within the frequency band from 120 to 150 kc. is passed by the band pass filter 71', rectified and refiltered and applied to the same altitude servomotor within the servo system 76 to cause the lowering of the elevators on the missile thereby causing the missile to decrease in altitude as indicated by the arrow designated "Down."

In the event signal received from the control station 215 is of a frequency within the band from 200 to 250 kc. for changing azimuth, the signal is also accompanied by signal of 175 kc. frequency to energize the relay windings 65 to 68 inclusive, such signal is passed by the third discriminator 61. The energization of the relay winding 67 closes upwardly the relay switch 67' to apply the output from the third discriminator 61 to the amplifier 70'. The energization of the relay winding 68 draws the relay switch 68' upwardly to engage contacts connected to band pass filters 73 and 73', the band pass filter 73 passing signal of a frequency between 200 to 225 kc. and the band pass filter 73' passing signal between 220 to 250 kc. In the event the received signal is of a frequency within the band from 200 to 225 kc., the signal is rectified and filtered and is applied to an azimuth motor, not shown, in the servo system 76 causing the elevator to be moved toward the left and thereby alter the flight course of the missile in azimuth toward the left as indicated by arrow "Left." In the event the band pass filter 73' receives signal within the band from 220 to 250 kc., such signal is rectified and filtered and applied to the same azimuth servomotor in the servo system 76 to cause its rotor to operate in the reverse direction, causing the missile rudder to move toward the right and to alter the flight course of the missile in azimuth toward the right as indicated by arrow "Right." It will be noted that there is a 5 kc. overlap in signal frequency between the band pass filter 73 and band pass filter 73', which is conventional practice in such filters and improves the function thereof. Such overlap has previously been pointed out in the band pass filters 71 and 71'. Proportionality in the amount of control that is exercised over the servo motor in this application of the present invention is arrived at by designing the band pass filters as 71 to pass frequencies of 100 kc. with a minimum attenuation and those of 125 kc. with a maximum attenuation, with a linear response between these two frequencies. The potential applied to the servo motor is then inversely proportional to the attenuation of the filter 71. In like manner the proportion of control in azimuth resulting from the application of signal to the filters 73 and 73' is proportional within a predetermined time period to the application thereto of signal within the respective bands thereof.

The missile circuit is designed so that under normal conditions the missile flies under automatic control. If it is desired to place the missile under remote control, a sinusoidal wave of a predetermined frequency such as 175 kc., for example, is transmitted from the control station shown in Figs. 12 and 15. As long as the signal of 175 kc. continues to be transmitted from the control station, the pair of relay windings 65—66 and 67—68 at the missile 18 remain energized and the associated switches bearing corresponding numerals primed are closed upwardly. The servo system 76 will then be controlled by signal from the control station that is intercepted at the missile by the antenna 69 and that is passed by the second and third discriminators 60 and 61, respectively.

In Fig. 5, saw tooth waves are supplied to both the vertical deflection coil 81 and to the horizontal deflection coil 80 to serve both the automatic control channel and the remote control channel. The frequency of the saw tooth wave that is supplied to the vertical deflection coil 81 is determined by the frequency of the vertical oscillator 52 and that supplied to the horizontal deflection coil 80 is determined by the frequency of the horizontal oscillator 52d. The saw tooth wave that originates at the vertical oscillator 52 is passed through a vertical sweep correction circuit 50 and vertical output amplification stages 51 to the vertical deflection coil 81 where it controls the vertical components of the sweep of the electron beam 22 over the condensers on the mosaic 20. From the vertical deflection coil 81, this saw tooth wave together with signal from the automatic control channel is applied to the vertical coupling circuit 78.

The horizontal oscillator 52d is provided to generate a second saw tooth wave that is passed through a horizontal sweep correction circuit 72, horizontal output stages 75 and applied through the horizontal deflection coil 80 together with signal from the automatic control channel to the horizontal coupling circuit 79. A blanking equipment 145 is provided for blanking out the electron beam 22 in usual manner upon its return sweep. A high voltage rectifier 150 is associated with the horizontal amplification output stages 75 and a horizontal damping circuit 151 in its application to the electron gun 32 of the heat seeker 39. A keystone circuit 97' makes the electron scan uniform and corrects for distortion due to the angle that the electron beam 22 makes with the mosaic 20. Both saw tooth waves to the coils 80 and 81 are synchronized with signals in both the automatic and the remote channels by the operation of a synchronizing amplifier 146.

Figure 6:
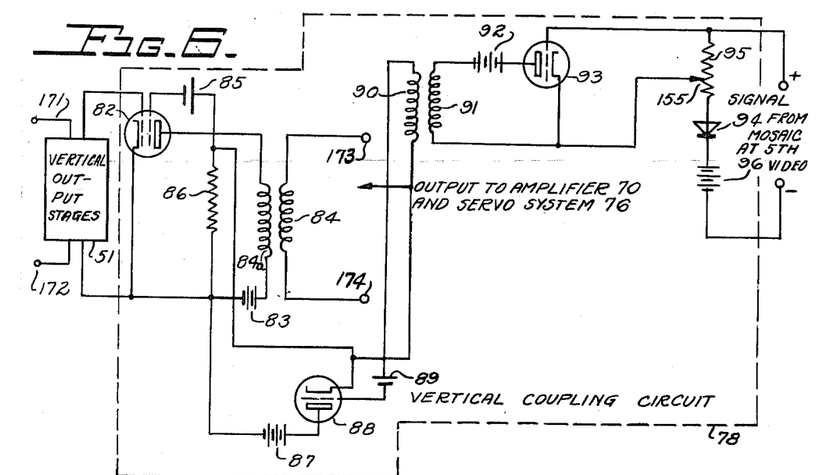
Fig. 6 is a schematic circuit diagram of a vertical or horizontal coupling circuit in the automatic channel of Fig. 5.

The synchronization of the horizontal and the vertical deflection coils 80 and 81, respectively, with the target signal 125 from the mosaic 20 is accomplished principally by those portions of the circuit that are shown in Figs. 6 and 7 of the accompanying drawings. The vertical shading network 77 and a horizontal shading network 77' are associated with both of the saw tooth waves from the vertical output stages 51 and the horizontal output stages 75, respectively, and introduce an artificial signal that corrects for the splashing of electrons. The grill 19 performs a similar function. The outputs from the networks 77 and 77' are applied to the signal from the mosaic 20 at the input end of the 1st video amplifer 58.

Figure 9:
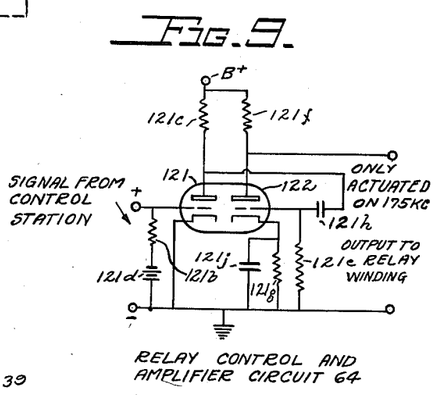
Fig. 9 is a schematic circuit diagram showing details of the relay control and amplifier circuit of Fig. 5.

In Fig. 9 of the accompanying drawings there is shown a detailed schematic drawing of the relay control and amplifier circuit 64 in the remote control channel of the circuit shown in Fig. 5. The relay control and amplifier circuit 64 comprises a relay control tube having sections 121—122 within a single envelope. The tube is a double triode which, when passing current, energizes the pair of relay windings 65—66 and 67—68. The tube is operated with its first section 121 biased below cut off through a resistor 121b by battery 121d to prevent its operation by spurious signals. As long as a signal of sufficient amplitude is applied to the grid of the tube section 121, the tube conducts current. The output from tube section 121 is amplified in tube section 122 by being applied through the capacitor 121h to the grid of the tube section 122. The grid of the tube section 122 is provided with a grid leak resistor 121e. The cathode of the tube section 122 is bypassed to ground through resistor 121g shunted by capacitor 121j. B+ plate current is supplied to the plates of both tube sections 121 and 122 through the resistors 121c and 121f, respectively, which are connected in parallel. The output of tube section 122 for relay operation is picked off the plate of the tube section 122 at its junction with resistor 121f. Assuming now that the missile is on remote control, signal from rectifier and filter 63 in Fig. 5, is applied to the tube section 121, overcoming the grid bias from battery 121d which is applied to resistor 121b. When the operator at the control station ceases operation, or if jamming occurs the 175 kc. wave is cut off and consequently the tube 121—122 is no longer operated. When no signal is applied to the grid of tube section 121 or when signal is so small that it cannot overcome the bias voltage the tube does not pass current. When the tube sections 121 and 122 do not conduct current the relays are closed downwardly by spring pressure and the system returns to automatic control.

*Coupling circuits*

In Fig. 6, which illustrates schematically the vertical coupling circuit 78, triggering of the saw tooth waves by the signal 125 is accomplished. Figs. 6 and 7 may be examined together, since the terminals 171 and 172 at the right hand end of Fig. 7 are the same terminals as those at the left and end of Fig. 6.

The target signal 125 from the automatic control channel 5th video amplifier 58 enters the circuit of Fig. 6 from the right hand end. It should be borne in mind that this signal simultaneously enters the vertical and horizontal coupling circuits respectively in parallel to 78 and 79. The horizontal coupling circuit 79 is substantially a duplication of the vertical coupling circuit 78 shown in Fig. 6.

A rectifier 94 is provided to rectify signal entering the vertical coupling circuit through a resistor 95. A battery 96 is provided in series with the resistor 95 and rectifier 94 to prevent flow of current through resistor 95 except when the signal voltage is larger than the voltage of battery 96. Entering signal 125 from the mosaic is applied across the portion of resistor 95 which is above tap 155 and across the grid-cathode circuit of tube 93. Entering signal 125 will therefore appear as a surge of potential across the grid cathode circuit of tube 93. Such surge is amplified by tube 93 and produces a voltage pulse through the transformer primary winding 91 and by induction to the secondary winding 90. The secondary winding 90 is connected across the grid-cathode circuit of tube 88 with grid bias providing battery 89 in series in the circuit. The surge effect causes the grid of the tube 88 to become sufficiently positive to enable a saturation current to flow through that tube. A resistor 86 is connected in series with a battery 87 across the tube 88. The cathode of the tube 88 is connected through a battery 85 to the screen grid of a tube 82. The tube 82 is connected across a transformer primary winding 84a through a battery 83. Each target signal 125 therefore causes the same voltage to be impressed across the resistor 86 and upon the screen grid of tube 82. A secondary transformer winding 84 in the vertical coupling circuit 78 applies its output to terminals 173 and 174. These terminals 173 and 174 are adapted to be releasably contacted by the pair of switch arms 65' which connect into the amplifier 70 as shown in Fig. 5.

Referring now to Fig. 7, a row of condenser plates 30 on the mosaic 20 is represented by each rectangle 30'. At the right hand end of each row of condensers 30, there is a pair of metallic sweep correction plates 98 and 98'. The sweep of the electron beam 22 is represented as 22' in Fig. 7 and its direction is indicated by arrows 156 and 157. When the arrows 156 are directed toward the right, the beam is energized. When the arrows 157 are directed toward the left, the beam is blanked out. The beam 22 is lkewise blanked out when it lifts from the lower right hand corner to the upper left hand corner in the conventional manner. The sweep correction plates 98 are each connected in parallel to a resistor 152 and to the grid of a tube 104. The sweep correction plates 98' are each connected in parallel to the resistor 153 and to the grid of a tube 105. The resistors 152 and 153 are connected in series across the grids of tubes 104 and 105. The junction 103 of the resistors 152 and 153 is connected to the cathodes of the tubes 104 and 105 and to the negative terminal of a battery 144. The plates of the tubes 104 and 105 are connected across a resistor 126 which is center-tapped to the positive terminal of the battery 144 and is also connected across a transformer primary winding 106.

The synchronization of the horizontal and vertical deflection coils by the signal from the mosaic correction plates 98 and 98' of importance and the vertical coil synchronization is accomplished primarily between portions of the circuit that is shown in Fig. 7 of the accompanying drawings. Precision in the sweep of the scanning electron beam 22 over the mosaic 20 is accomplished by the vertical sweep correction circuit 50 that applies its amplified output to the vertical oscillator 52, where it is applied across the grid-cathode circuit of the variable resistance tube 99.

In the electron sweeping operation of the mosaic 20 by the electron beam 22, as diagrammatically illustrated in Fig. 7, the electron beam 22 follows a course in its scanning that is represented by a continuous black line 22' in the direction indicated by arrows with the return sweep indicated by the line 157. The electron beam 22 is energized only when sweeping along the rows of condenser plates 30' and between pairs of sweep correction plates 98 and 98' at the right hand ends of the rows of condenser plates 30'. The electron beams 22 is deenergized upon both its return sweeps indicated by the numeral 157, from one row of condenser plates to the next and upon its return sweep from the lower right hand corner of the mosaic to the upper left hand corner thereof, also indicated by the numeral 157 in Fig. 7.

At its impact with the mosaic 20, electron beam 22 is slightly wider than the space separating members of each pair of sweep correction plates 98 and 98' so that normally each of the plates of a given pair receives substantially equal negative charges from the electron beam 22. In a normal sweep, consequently, equal negative potentials are applied simultaneously to the ends of the resistors 152 and 153 remote from their junction 103 that is maintained at ground potential. No current flows therefore at the resistor center tap 103 as long as the electron beam 22 imparts equal negative charges to both of each pair of sweep correction plates represented by the sweep correction plates 98 and 98'.

In the event, however, that the electron beam 22 imparts a greater negative charge because of imperfect synchronization or the like, to the sweep correction plate 98 than it does to the sweep correction plate 98', for example, then the grid of the tube 105 is momentarily of a more positive potential than the grid of the tube 104. The resulting tube conduction applies a positive pulse across the transformer primary winding 106 in one direction and hence inductively across the transformer secondary winding 107. The positive pulse so induced from the primary winding 106 into the secondary winding 107 is increased by the amplifier 154 and is applied across the grid-cathode circuit of the tube 99 in the vertical oscillator 52.

The function of the vertical sweep correction circuit 50 is to correct certain non-linear characteristics of the electron beam 22. If the beam is late or early it may scan above or below its correct position and strike the photo-sensitive material 33 rather than the rows of condenser plates 30. To minimize this situation the pairs of sweep correction plates 98 and 98' are positioned to the right hand end of each row of condenser plates 30 so that if the scanning electron beam 22 is slightly behind or ahead of its proper position it will strike one more than the other of a particular pair of end plates and a correction signal will then be applied to bring the beam back to the center of the row of condenser plates 30.

When perfectly synchronized, opposite edges of the electron beam 22 strikes and applies equal negative charges to each of a pair of the sweep correction plates 98 and 98' if the center of the beam 22 passes therebetween under the action of the sweep deflection coils 80 and 81, as previously stated. In the event the electron beam 22 strikes one or the other of a pair of the sweep correction plates 98 and 98' to a greater extent than the other, the correction signal is applied to the variable resistance tube 99 and from thence to the vertical deflection coil 81 and functions to correct the vertical component of the synchronization of the next succeeding sweep of the electron beam. This result is accomplished by both the direction and magnitude of the charge applied to the capacitor 102 that receives its charge, as modified by the change in conduction of the tube 99, as a result of signal originating at one or the other of a pair of the sweep correction plates 98 and 98'.

When the sweep of the electron beam 22 is too late the resistance of the tube 99 is modified in the inverse sense from its resistance when the sweep of the electron beam 22 is too far ahead. In one case the amplified voltage increases the resistance of the tube 99 and in the other case decreases it. Increase occurs as current flows clockwise through the tubes 104 and 105 and the resistance 126. The rate and magnitude of charge on the condenser 102 is altered by the resultant increase or decrease in the resistance of the tube 99. As a result, the scanning by the electron beam 22 is corrected by the current passing through the vertical deflection winding 81, so that in its next sweep it follows a path along the centers of the next row of condenser plates 30.

The battery 144 supplies plate voltage to tubes 104 and 105. The transformer secondary winding 107 is inductively coupled to the primary winding 106 and its output is applied to an amplifier 154. The output of amplifier 154 is applied across the grid-cathode circuit of a tube 99 in the vertical oscillator 52. Tube 99 is supplied with plate current from a D.C. source 143. Tube 99 provides a variable resistance in the circuit and determines the amplitude of the saw tooth wave. Vertical deflection coil 81 is in series with tube 99 and a resistor 101 across the direct current source 143. A condenser 102 is connected across the deflection coil 81. A thyratron tube 120d is connected across condenser 102. Periodically the tube 120d short circuits the condenser 102 when the condenser is charged to a predetermined value. A battery 142 is connected across the filament-grid circuit of tube 120d to provide grid bias for the tube. Tap 140 on resistor 141 is so positioned as to make the voltage across the upper part of the resistor 141, indicated as $V_B$, equal to one-half of the maximum voltage across the electron beam deflection coil 81. The voltage $V_B$ raises the zero line X in Fig. 11 of the saw tooth wave across the deflection coil 81 so as to provide opposite polarity when the scanning beam passes the center of the mosaic. The output of the circuit is taken off terminals 171 and 172, which correspond with the left-hand terminals of Fig. 6. Terminal 171 is connected to the junction of resistor 101, plate of tube 120d and the positive end of deflection coil 81. Terminal 172 is connected with tap 140 on resistor 141. There is a reversal of polarity between the terminals 171 and 172 midway of each individual sweep of the electron beam 22 as indicated by the point B of Fig. 11.

Terminals 171 and 172 are applied in Fig. 6 to the vertical output stages 51. The output from the vertical output stages 51 is applied across the control grid-cathode circuit of tube 82. Within the tube 82 saw tooth wave is applied to the control grid-cathode circuit and signal 125 is applied to the screen grid-plate circuit of tube 82. The signal 125 triggers the tube 82 into conduction.

As soon as tube 82 conducts, a surge of current is impressed across the transformer primary winding 84a and induced into the secondary winding 84. Terminals 173 and 174 are consequently energized. Terminals 173 and 174 are shown in both Figs. 6 and 5. If the relay switches 65'—66' and 67'—68' are closed downwardly, indicating that the missile is on automatic operation, then the output from terminals 173 and 174 is applied to amplifiers 70 and 70'. The output of these amplifiers flows directly to the proportional vertical and horizontal servo system 76, where it is applied to power relays (not shown). When the power relays are closed, a servo motor for the The horizontal synchronizing separator 138 applies its output successively to a horizontal oscillator and discharge 197, a horizontal sawtooth amplifier 198, a horizontal output circuit 199 and a bias rectifier 202. The output of the latter is applied to an automatic volume control rectifier 134. Also applied to the kinescope 108 are vertical and horizontal channels controlling the sweep of the cathode ray beam within the kinescope 108 in a usual manner.

Means for sighting the missile is provided, as shown in Figs. 12, 13, and 14, wherein an optical system 111 comprising a pair of lenses with crossed hairs 111a and 111b disposed between them and intersecting at right angles at substantially their common center is mounted in a setting 207 for travel substantially throughout the area of the screen 157. Preferably, the optical system 111 is mounted in coincident portions of slots in a pair of cursor blades 109 and 110 that are disposed at right angles with respect to each other. The setting 207 for the optical system is a cylinder provided with front and rear flanges 209 and 210 which contact the front and rear respectively of the cursors 110 and 109. The cursors 109 and 110 are mounted for smooth manipulation across and up and down upon the screen 157 to sight cross hairs 111a and 111b upon the target. The cursor 110 at its upper end has a yoke 189 in which is journalled for unrestricted rotation a pinion 190 that continues in a shaft 191 to the rotor in a left-right translating selsyn 112. The teeth of the pinion 190 travel along a rack 192 firmly mounted upon the upper edge of the kinescope 108 above the screen 157. A second yoke 203 extends around a projecting ledge 204 of the top of the box 205 which houses the kinescope. It holds the selsyn 112 erect. The cursor 109 terminates at its right hand end in a yoke 188, or the like, in which another pinion 193 is journalled through a slot 206 for free movement and by its turning causes the rotation of a rotor within an up-down translating selsyn 113. The teeth of the pinion 193 follow along another rack 194 firmly mounted along the right-hand edge of the kinescope 108 adjacent the screen 157 thereof. Up and down motion of the cursor 109 is translated through the selsyn system 113 and 160 in a conventional manner for causing the operation of a tuning means within a variable frequency oscillator 117. The ratio between the racks 192 and 194 and their pinions 190 and 193 is preferably such that the pinion will make one and only one revolution in its travel from one end of the rack to the other. For convenience in drawing, this ratio has not been shown in Fig. 13, but it requires no more than mechanical skill to product it. For example, if the outer diameter of the pinion is one inch, then the rack should be 3 and ¼" long. In the present system, the distance across the kinescope screen is proportional in a 1 to 1 ratio vertically with the extent of motion of the elevators of the missile and horizontally with the full motion of the rudders. If the cross hairs 111a and 111b are in the exact center of the kinescope screen, the missile will fly straight ahead. If the cross hairs are all the way to the left, the missile will fly as hard left as possible. If the cross hairs are up as far as they will go on the kinescope screen, the elevators will be in their maximum Up position on the missile.

Oscillator 117 has a frequency range of from 100 to 150 kc. The kinescope screen 157 preferably is calibrated vertically in 50 equal subdivisions conforming to this frequency band. A similar selsyn system comprising a left-right selsyn 112 and a left-right selsyn 161 is joined adjustably in a similar manner to tuning means in the variable frequency oscillator 118. This oscillator has a tuning range from 200 to 250 kc. The kinescope screen 157 preferably is calibrated laterally in 50 equal subdivisions conforming with this frequency band. The distances through which the cursors 109 and 110 can be moved across the kinescope face correspond to the frequency band desired from the oscillators.

When it is desired to control the missile 18 from the ground or control station 215, the optical system 111 is moved over a selected target represented by a spot of light on the kinescope screen 157. Movement of the optical system also moves the cursors 109 and 110 and rotates their corresponding selsyns 113 and 112. The 175 kc. band is turned on while the operator is sighting. The movements of the transmitting selsyns 112 and 113 are now translated into movements of the receiving selsyns 161 and 160 and they accomplish by direct mechanical connections such as shafts 212 and 211, respectively, the desired frequency changes in oscillators 118 and 117, respectively.

The outputs from the oscillators 117 and 118 are applied to the audio frequency amplifier 115. The output from another oscillator 116 supplies a sinusoidal wave of a frequency 175 kc., that also is applied to the amplifier 115. The output from the amplifier 115 is passed to a reactance tube 162. Output from the reactance tube 162 is applied to a discriminator 163 and frequency converter 164 and to a frequency modulated oscillator 165 and frequency multipliers 166. Oscillation from a crystal oscillator 155 are fed through a frequency multiplier 167 and applied to the frequency converter 164. The output from the frequency converter 164 together with that from the frequency multipliers 166 is applied to a power amplifier 170 from which it is radiated from antenna 158 in the television transmitter 114 shown in Fig. 12, to the receiving antenna 69 at the missile and shown in Fig. 5.

*Operation*

In the operation of the electronic infra-red ray actuated system that is disclosed herein for directing an airborne military missile to a target which emits comparatively strong heat waves, the missile 18 may be launched from a mother airplane, not shown, or from other desired launching means such as a launching ramp disposed upon the ground, upon the deck of a war ship, or the like. The missile 18 is normally launched toward its target so that the target directs the flight course of the missile by heat emitted from the target which forms a hot spot on the mosaic 20 in the heat seeker 39. The latter is disposed in the nose of the missile, as previously described. Alterations in the setting of the controls on the missile 18 depend primarily upon the particular quadrant of the mosaic 20 in which a hot spot from the target is disposed. A simplified diagram of the broad overall system that embodies the present invention is shown in Fig. 15 of the accompanying drawings.

Signal 125, initiated at the mosaic 20, is applied simultaneously to an automatic channel 58 and to a remote control channel 58d. The missile 18 is altered in its flight course automatically by signal applied to the automatic channel 58 and passing the automatic bias control 77 which screens out background heat. Signal 125 passing switch 217 in its spring-pressed position through the automatic channel is applied to servo station 76 in which it operates controls 216. In the event that the hot spot is on the upper right-hand quadrant of the mosaic 20, then the controls 216 are altered to change the flight course of the missile upward and toward the right so that the hot spot is maintained at substantially the center of the mosaic 20. Corresponding adjustment results from the disposition of the hot spot on the mosaic 20 in any of the other three quadrants of the mosaic.

Signal applied to the remote control channel 58d is inclusive of all heat sources that are applied to the mosaic 20, inclusive of both target heat source and background heat sources. All of these various heat sources are applied to remote control channel 58d and radiate from antenna 46 of television transmitter 97'. Remote control station 215 is provided for use in returning the missile 18 to its on-course position if, for any reason, such external control needs to be exercised. The ex- Up and Down signals and a servo motor for the Left and Right signals are energized. Both motors are not necessarily energized simultaneously. Both motors are reversible according to the direction in which their field windings are energized.

Mosaic orientation

In order that the servo system 76 may properly govern the flight course of the missile, means for identifying that portion of the mosaic 20 in which the target signal 125 appears is provided. The following matter discloses how the vertical and horizontal saw tooth waves which originate in vertical oscillator 52 and horizontal oscillator 52d, respectively, are triggered by the target signal 125 so that the sawtooth waves can give the required corresponding controls. The target signal 125 is synchronized with the waves passing through the output of the coupling circuit from the deflection coils 80 and 81 at the instant the scanning beam 22 encounters the target image on the mosaic 20.

The result of triggering the saw tooth waves with the target signal 125 is primarily to enable the saw tooth waves to operate power relays (not shown) within the servo system 76 at the instant and only at the instant that the correct triggered voltage appears from the saw tooth wave, that will correspond to the portion of the mosaic 20 over which the electron beam 22 was passing at the time that the signal 125 appeared on the mosaic 20. By this correct voltage is meant the voltage which is proportional to that on the deflection coils 80 and 81 at the instant at which the hottest spot on the mosaic is encountered by the beam 22. In this way the voltage of the saw tooth at the point at which it is synchronized with the signal 125 indicates the distance of the hottest spot from the center of the mosaic.

Referring now to Figs. 8 and 11, the former indicates the voltage sweep of the electron beam 22 as it is governed by one of the deflection coils 80 or 81. Fig. 8 is considered in conjunction with Fig. 11 which shows the voltage amplitude sweep ABC which corresponds to the same sweep ABC shown in Fig. 8. On Fig. 8, the arrow 186 indicates the scanning sweep of the electron beam 22 and arrow 187 indicates the return sweep during which the beam is blanked out. In both Figs. 8 and 11, A represents the most negative voltage, B is a neutral point, and C is the most positive voltage. In Fig. 11 from C to A' the beam is blanked out, i.e., no energy is applied to it. The means by which the neutral point B is applied in this wave will be disclosed in the description of Fig. 7.

When the electron beam 22 starts at point A to scan the mosaic 20, the potential on the sawtooth wave is most negative and becomes less negative until the beam reaches the middle point B on either Fig. 8 or Fig. 11. There is a reversal of polarity at point B. The remainder of the sweep, i.e., from B to C, is of increasingly positive voltage. It is evident therefore that if the target signal 125 appears in that half of the mosaic lying between A and B, it will be synchronized with a negative part of the sawtooth wave AC. This sawtooth wave appears across the deflection coils and the zero line 98 is raised by the amount $V_B$ to be hereinafter defined. If the target signal occurs on the right-hand side of the mosaic, i.e., between B and C, it will trigger a positive part of the sawtooth wave AC between the points B and C.

Since there are two deflection coils, horizontal and vertical, and since there are also two sawtooth waves, horizontal and vertical, and since both waves are triggered by the same signal 125 at the same time, it is evident that the vertical saw tooth wave will determine by its polarity whether the signal is in the left-hand or right-hand half of the mosaic. The horizontal sawtooth wave will determine by its polarity whether the signal appeared in the upper or lower half of the mosaic. Consequently, the two waves acting together will indicate by their polarities in which quadrant of the mosaic the target signal appears.

Since the waves are changing voltage constantly, the instant of triggering will indicate by the voltage of the wave at that instant the position of the scanning beam 22 on the mosaic 20 when the signal appeared and consequently the distance of that signal or hot spot from the center of the mosaic where the voltage is zero in all quadrants.

In the case which has been assumed, that the hottest spot appears in the upper right-hand quadrant of the mosaic 20, the vertical sawtooth wave will be synchronized with the target signal 125 at a point between B and C on the positive part of the wave and the horizontal sawtooth wave will be synchronized with the target signal at a point on the negative part of a sawtooth wave between A and B. Therefore, the left-right servo motor will be energized to turn the missile controls to direct the missile toward the right and the up-down servo motor will be energized to turn the missile controls in an up direction. The resultant of both vectors will direct the missile upwardly and toward the right until the hottest spot on the mosaic is more nearly central thereof. The speed of the servo motors will be proportional to the voltage impressed thereon, which will in turn be proportional to the voltage across the deflection coils 80 and 81 at the time that the hottest spot was encountered by the electron beam 22 on the mosaic 20. The duration of time throughout which the servo motors will operate will be determined by the length of time that the missile will take to orient itself so that the hottest spot will appear more nearly at the center of the mosaic, at which time no energy will actuate the servo-motors. This result will occur because at the exact center of the mosaic there will be no positive or negative voltage from that portion of the sawtooth wave indicated by the line 98 which corresponds to the location of the hottest spot centrally of the mosaic. The missile will then fly a straight course to the target.

Control station

The circuit shown in Fig. 12 for disposition at the control station comprises a receiver 53 to which signal intercepted by antenna 47 is applied and transmitter 114 that radiates signal over a transmitting antenna 158 to be intercepted at the missile. The transmitter 114 is shown enclosed within a double dash line in the drawing. A kinescope 108 is common to both receiver 53 and transmitter 114. As is usual in television reception over the entire mosaic 20 is presented upon the screen 157 of the kinescope 108 for study by observers. A hot spot on the mosaic 20 will appear as a zone of maximum light intensity upon the screen 157 of the kinescope 108. In the receiving circuit, the received signal is amplified by amplifier 168 and detected by detector 169 where its frequency is beat against the frequency of an oscillator 159 from which it is applied as intermediate frequency to the usual plurality of intermediate frequency stages 180, 181, 182, 183, 184 and 185. Output from the intermediate frequency stages is applied to a second detector and limiter 129. Part of the output of the detector and limiter is applied directly to the kinescope 108. The remainder is subjected to video amplification in the 1st, 2nd, and 3rd video amplifiers from which it is applied to the kinescope 108. The 3rd video is also associated through an automatic volume control amplifier 133 and rectifier 134 with the third IF stage 182. The 2nd video amplifier 131 is connected to a D.C. setter amplifier 135 to both a D.C. setter rectifier 136 and to a vertically synchronizing separator 137 and a horizontal synchronizing separator 138. The vertical synchronizing separator 137 is connected with vertical oscillator and discharge circuit 195 to provide a vertical output 196 that is connected with the kinescope 108, ercising of remote control over the missile 18 would arise where a plurality of hot spots appear upon the mosaic 20 arising from a plurality of targets; where the missile 18 was launched after a jet propelled plane which by evasive action had succeeded in getting outside of the 20° solid angle subtended by the heat seeker 39; from electronic or mechanical imperfections arising within the missile itself; or for other reasons.

A full television presentation radiated from the antenna 46 of the television transmitter 97' is intercepted by the antenna 47 at control station 215 and passed to television receiver 53, as previously explained, where presentation is made upon the screen of the kinescope 108. An operator at the kinescope 108 selects from among the signals that are presented upon the screen thereof, a particular target toward which the missile is to be directed, or a particular portion of a large target from a cluster of hot spot signals. The latter may represent an extensive plant such as a large steel works or the like. By operation of the cursors 109 and 110, the point of intersection of the crosshairs 111a and 111b provide a means for sighting the missile precisely upon a selected target. As previously stated, movement of the cursors 109 and 110 alters the disposition of rotors within the selsyns 112 and 113 which is duplicated in the selsyns 161 and 160 that correspondingly variably tune the oscillators 118 and 117, respectively. The adjustments of the oscillators 118 and 117 divide frequency modulation of the carrier wave that is radiated from the antenna 58 of the transmitter 114 from the control station 215. Frequency modulation of the carrier from the transmitter 114 is preferred since it permits better transmission in the presence of natural or man-made interference and is less subject to interruption from enemy jamming or the like, than is amplitude modulation. Signal emitted from the transmitting antenna 158 at the control station 215 is intercepted at the missile by receiving antenna 69 and is applied to receiver 43'. As previously stated, signal of a frequency of 175 kc. energizes relay windings associated with the amplifiers 70 and 70' of Fig. 5 and causes switch 217, shown in Fig. 15, to connect the receiver 43' with the servo station 76. Frequency modulated signal originating in the oscillator 118 in Fig. 12 and of a frequency within the band from 200 to 250 kc. upon arriving at the servo station 76 in Fig. 15 is applied by the servo station 76 to alter the controls 216 and to change in azimuth the flight course of the missile 18 to a predetermined proportional degree. In a similar manner, signal originating in oscillator 117 in Fig. 12 of a frequency between 100 and 150 kc., upon arriving at the servo station 76 alters in a predetermined, proportional degree the elevational settings of control 216 upon the missile 18. The proportional control that is so exercised is accomplished by the relative amount of signal that, within a predetermined time interval passes the band pass filter 73 and 73' for alterations in azimuth control over the missile 18. For example, if during the given period, signal of 110 kc. is passed by band pass filter 71 twice as long as signal of 140 kc. is passed by filter 71', then the controls 216, such as the elevators on the missile, will be adjusted to increase the elevation of the missile with double the strength of signal to decrease the elevation and hence the elevation of the missile will be increased in proportion of one-half full upwardly directed elevator adjustment.

In any event, if the frequency modulation signal from the control station 215 is interrupted for any reason whatever, and in the absence of signal of 175 kc. the switch 217 in Fig. 15 is spring-pressed to reconnect the automatic channel 58 with the servo station 76 and cause the missile 18 to resume its flight course under signals from the mosaic 20 transmitted along its automatic channel 58. The system herein disclosed can be operated interchangeably at will in either direction from the automatic channel to the remote control channel or the reverse by the absence or presence, respectively, of signal of 175 kc. The system that is disclosed herein is a definite improvement over any known prior existing system and is particularly applicable for use in the supersonic rates of flight that at the present time are so outstanding and important in airborne equipment.

The missile is preferably launched so that its initial direction is in the general direction of the target. When so launched from a mother plane, there is little or no danger of the missile pursuing the mother plane since heat signals from the mother plane will not strike the mosaic 20 in the missile from the direction toward which the missile will fly. However, in order to avoid accidents, should the unforeseen occur, it is advisable to be ready to broadcast on the 175 kc. band. As soon as this band is operating, the human operator can take charge of the direction of the missile by means of the kinescope cursors. Obviously, if there is no tendency to pursue the mother plane, the 175 kc. band may be left "off" until some selection of a target must be made. So long as there is no reason to transfer from the automatic operation of the missile, a human operator at the control station 215 should not do so; he should only adopt human control where such discrimination as requires a human understanding is necessary. To be able to recognize such a situation when it arises, however, he shoud continuously follow the progress of the missile by means of the heat pattern which continuously appears upon his kinescope 108. In Fig. 15 the switch 217 represents the simple change in settings brought about from the automatic channel 58 as to whether the signal will enter the servo mechanism 76 or whether that mechanism will be placed under the control of the receiver 43'. Switch 217 represents simply, the more complex switch organization shown in Fig. 5 by the numbers 65, 66, 67, 68 and 65', 66', 67', and 68'. It is to be understood that the servo station 76 operates the missile flying controls 216 after the manner that a human pilot operates the controls of a conventional airplane. Upon successful completion of its mission, the missile will, of course, be destroyed by explosion.

As will be seen from Fig. 15, the missile or control station 18 is able to transmit and to receive radio waves simultaneously. For this reason it is preferred that there be a comparatively wide operation either in wave length or in frequency, depending upon whether amplitude- or frequency modulated communication is used, so that no interference will be created between the receiver 43 and the transmitter 97' in the missile. The same conditions are desirable in regard to the control station 215 in which the transmitter 114 and the television receiver 53 must be prevented from interfering with each other.

*Alternatives*

Numerous alternatives may be practiced without departing from the spirit of the invention. Some of the less obvious ones are here discussed:

*Heat sensitive elements.*—Bolometers, thermocouples or "thermistors" can be used in place of the specific cells herein disclosed, so long as they are sensitive enough and they act quickly enough to insure accurate flight. In view of the fact that many modifications may be made in the apparatus and the result still be obtained, it is evident that a general method has been disclosed, namely that of directing to a target a missile comprising a frequency modulated receiving set, and a servo-operated guiding system governed by said receiving set which comprises locating upon a television screen the target to which the missile is to be directed, converting the motions necessary to locate the target on the screen to a pair of selsyn settings, converting said selsyn settings into proportionality between two wave bands of a higher and lower frequency and then converting within the missile the received mixed signals into horizontal and vertical servo-actuated motions in the same ratio that the location on the television screen bears to the limits of said screen and the selsyn settings governed thereby.

Numerous other modifications may be made without departing from the spirit of the invention.

The term "automatic control channel" as used in the specification and claims means the signal channel and apparatus for receiving it, to keep energized the relay windings 65—66 and 67—68 by means of which the missile is kept on self-directed flight.

The invention claimed is:

1. An airborne missile having a nose at its forward end and controls for regulating and directing the flight course of the missile, comprising a heat detecting mosaic in the nose of the missile orientationally responsive to the presence of a heat emitting object in front of the missile by producing an electrical pulse in response thereto, an automatic control channel to which the pulse so produced is applied, an electro-mechanical servo system adapted for receiving the pulse from the automatic control channel and in response thereto adjusting the setting of a flight control on the missile, a remote control channel connected in parallel with said automatic control channel and to which the same pulse produced by the heat detecting mosaic is simultaneously applied, means in said remote control channel for converting the pulse into signal for radiation from the missile, a receiver in said missile adapted for intercepting and applying a received signal to said electro-mechanical servo system selectively for adjusting the setting of the same flight control on the missile, and means, including relays held in closed position by signal received through the remote control channel, for changing to automatic control of the missile upon cessation of said signal with consequent opening of the said relays.

2. An airborne missile having a nose in its forward end and a plurality of controls for regulating and directing the flight course of the missile, comprising a heat seeker in the nose of the missile, a mosaic in said heat seeker responsive to the presence of a heat emitting object in front of the missile, means for producing a cathode ray projected toward said mosaic, means for deflecting the cathode ray in a sweep across said mosaic, a pair of sweep correction plates adjacent the terminal end of said cathode ray sweep and spaced from each other to receive substantially equal electrical charges therefrom, a sweep correction circuit associated with said correction plates and producing an appreciable electrical output only when the cathode ray applies a greater electrical charge to one than to the other of said pair of plates, an oscillator circuit comprising a variable resistor to which the electrical output from said sweep correction circuit is applied, said variable resistor being connected in series with said cathode ray deflecting means across a current source for modifying the effect of said cathode ray deflecting means upon the cathode ray when the electrical charges applied to said pair of plates by the cathode ray are unequal and to recover equality of charge therebetween to keep the missile on its previous course in the absence of heat signal.

3. In a control system for a guided missile, an infrared sensitive detecting device and scanning means for said device within the missile adapted to initiate a control actuating signal upon receiving a local infra-red illumination, horizontal and vertical deflecting coils on said scanning means, means for originating sawtooth waves and for applying one of said waves to each of said deflection coils, a source of potential for bucking each sawtooth wave before its application to a deflection coil whereby the polarity of the sawtooth wave will be reversed as the scanning means crosses the center of said detecting device, electronic vertical and horizontal coupling circuits and signal output amplifiers associated with said deflecting coils to receive the output from said coupling circuits, each of said circuits being adapted to synchronize a signal originating in the detecting device with respect to a sawtooth wave and proportional to the distance between the point of origin of the signal and the center of the detecting device, horizontal and vertical servo mechanisms adapted for altering the flight course of the missile, said mechanisms being operably connected to receive the output from said amplifiers whereby proportional voltage and directional proportional control are provided for said mechanisms in accordance with the location of the signal with respect to the center of said detecting device.

4. In a control system for a guided missile, an infrared sensitive signal detecting device, a scanning device operatively connected thereto, an amplifier for amplifying signal from said detecting device, a circuit for diverting a portion of the amplified signal, a transmitter adapted to broadcast an image governed by the diverted portion of the signal, and a proportional control system within said missile including servo motors operatively connected to the guiding surfaces of the missile, said control system being adapted to guide the missile to the strongest-emitting infra-red ray-generating target, said system including automatic relays adapted to be overruled by a manually-controlled signal transmitted to said missile from a remote point, but adapted to change settings to permit scanned signal to resume direct control of the missile when said manually-controlled signal ceases.

5. In a control system for a guided missile, an infrared sensitive detecting device, a scanning device operatively connected thereto, a series of video amplifiers to amplify signal derived from the scanning device, a divided circuit comprising two channels, means for radiating signal from a first channel, an automatic proportioning circuit arranged to receive non-radiated signal from the second channel, bias means for isolating the highest voltage signal, a proportional vertical and horizontal electro-mechanical servo system operatively connected to the guiding surfaces of the missile, a selectively operated relay system within the missile whereby said relay system will be responsive to the highest voltage signal received by it from the detecting device and will operate said servo system in response thereto, said circuit and relay system being tuned to a predetermined system of frequency modulated waves, said relay system directing, on one of its settings, signal received from an appropriately-tuned control station to the missile controls and substantially immediately upon cessation of such signal, directing on the other of the said relay settings, signal from the infra-red sensitive detecting device through the first of said channels through the automatic proportioning circuit, to give directive proportional control to the said missile servo system.

6. A manually operated remote control for a guidable missile comprising in combination, a television receiver, a kinescope operatively connected thereto, a pair of cursors movably attached at right angles over the face of said kinescope, a selsyn motor operatively attached to each cursor, a radio transmitter of the frequency modulated type capable of transmitting on at least two frequency bands, said transmitter including at least two variable frequency oscillators to generate said bands, and a pair of receiving selsyn motors operatively attached to said oscillators, said motors being operatively connected to the cursor-adjustable selsyn motors attached to the kinescope, whereby movement of the cursors over the kinescope screen to place their common axes over a selected target will transmit to the missile frequency modulated waves of a frequency appropriate to operate controls on said missile to direct said missile to said target.

7. The method of directing to a target a missile containing a transmitter adapted to broadcast a television heat image of the terrain toward which said missile is flying, said missile containing also a frequency modulated radio receiving set and a servo operated electro-mechanical control guiding system governed by said receiving set, said method comprising locating upon the screen of a television receiving set by means of cursors, the heat image of the target to which the missile is to be directed, converting the cursor motions necessary to locate the target on the screen to a pair of selsyn settings, converting said selsyn settings into proportionality between at least two wave bands of different frequencies and then converting within the missile the received mixed signals into horizontal and vertical servo actuated motions in the same ratio to the limits of said motions as defined by the apparatus within the missile that the location on the television screen bears to the limit of said screen and the selsyn settings governed thereby.

8. In an infra-red detecting device, a heat seeker, an electron gun in said heat seeker for emitting an electron beam, a mosaic swept by the electron beam and providing signal when exposed to infra-red radiation, a plurality of pairs of sweep correction plates arranged at the sweep terminal ends of each sweep and substantially overlapping a pair of plates normally to impart equal negative charges thereto, an electronic sweep correction circuit receiving its input from said sweep correction plates, an oscillator arranged to time the travel of each sweep of the electron beam over the mosaic, a current source supplying current to said oscillator, a chargeable capacitor connected across said current source and being periodically chargeable thereby to increase the potential of a sawtooth wave, means for periodically discharging said capacitor to generate a sawtooth wave, deflection coil means connected across said capacitor for modifying the sweep of said electron beam, a variable resistance tube in said oscillator circuit for altering the frequency of discharge of said condenser upon being activated by the current impulse from said sweep correction plates whereby, should the electron beams be in advance or behind its correctly timed position for scanning said mosaic, the variable resistance tube will be changed in such an amount as to provide the proper correction of the voltage across the sweep condenser circuit to properly synchronize a sawtooth wave with the sweep of said electron beam during the sweep across the mosaic.

9. In a guided missile, an infra-red ray detecting mosaic, a scanning circuit for said mosaic, horizontal and vertical deflection coils operatively connected to produce the scanning motion of an electron beam generated by said scanning circuit, the electronic vertical and horizontal coupling circuits connected with the outputs from said deflection coils, output amplifiers connected to said coupling circuits, relays connecting said coupling circuits and said amplifiers, other relays connecting said amplifiers and a servo system, an electric-motor-powered servo system connected between said relays and adapted to actuate directional controls on the missile whereby a sawtooth voltage impressed on the deflection coils may be triggered in said coupling circuits by a heat signal detected by said mosaic at a time when said voltage is proportional to zero voltage in the same degree that the distance of the detected heat signal on the mosaic is proportional to the central point of said mosaic so that the proportional sawtooth voltage may control the application of power currents to said servo system to produce a motor speed and direction necessary to control the missile surfaces at the rate and to the extent that the missile will strike the heat emitting target.

10. In a control circuit for a guided missile or the like, a heat seeker, an infra-red ray sensitive mosaic therein, means for scanning said mosaic to initiate a signal therefrom, said mosaic scanning means including an electron beam and horizontal and vertical deflection coils for causing said beam to sweep said mosaic, means for providing sawtooth voltage for said deflection coils, a horizontal coupling circuit, a vertical coupling circuit, a source of D.C. potential arranged to buck the sawtooth voltage so as to reduce its potential and to provide a change of polarity as the beam crosses the center of said mosaic, said coupling circuits each containing a tube having two grids, means for connecting the sawtooth voltage to the first grid of said tube, and means for connecting the highest voltage component of the strongest signal received by the mosaic on the second grid of said tube, whereby to trigger said tube at such an instant and only at the instant of passage of a component of the sawtooth wave that will correctly represent by its proportionality to zero voltage and its polarity, the distance and direction of the point of origin of the signal upon the mosaic in proportion to zero voltage and zero polarity which is characteristic of the center point of the mosaic.

11. A remote control system of the character described for operation of a servo system, comprising a heat-signal sensitive mosaic having a row of capacitor plates, means for providing an electron beam for sweeping the capacitor plates of said mosaic, sweep correction plates associated with said mosaic to indicate the timing precision of the electron beam sweep with respect to the row of capacitor plates, a sweep correction circuit adapted to generate a time correcting signal for correcting the timing of said electron beam, an oscillator circuit containing an oscillator and associated with said sweep correction circuit and adapted to generate a sawtooth wave, means within said oscillator circuit to receive the correction signal applied by the sweep correction circuit to the sawtooth wave while it is being generated, a deflection coil adapted to receive said corrected sawtooth wave to cause the electron beam to scan said mosaic, a coupling circuit having a resistor across which is applied an electrical heat signal from said mosaic, a first tube within said coupling circuit and adapted to receive the heat signal and to produce a pulse therefrom, a second tube inductively coupled with the first tube and pulsed thereby to cause saturation current to flow through the second tube, a third tube in said coupling circuit and having a plate, two grids and a cathode and across the first grid-cathode circuit of which the output from said oscillator is impressed and across the second grid-cathode circuit of which the saturation current from said second tube is impressed thereby triggering said third tube into conduction and the output across said third tube being inductively coupled to provide an input into the servo system comprising an electrical impulse timed according to the position of the electron beam upon the mosaic at the time the electrical heat signal was generated by the mosaic.

12. In an infra-red ray detecting device, a heat seeker, an electron gun in said heat seeker for emitting an electron beam, a mosaic swept by the electron beam and providing signal when exposed to infra-red radiation, a plurality of sweep correction plates arranged adjacent the end of each sweep so that said beam passes substantially but not completely between them, normally to impart equal negative charges thereto in pairs, an electronic sweep correction circuit receiving its input from said pair of sweep correction plates, an oscillator circuit arranged to time the travel of each sweep of the electron beam over the mosaic, a variable resistance tube in said oscillator circuit, and a charging condenser circuit arranged to be activated by the voltage from the said plates whereby should the electron beam be in advance or behind its correctly timed position for scanning said mosaic, the variable resistance tube will be changed in such an amount as to provide the proper correction of the voltage across the sweep condenser circuit to properly synchronize the sawtooth wave with the sweep of said electron beam during the sweep across the mosaic.

13. A missile having therein a mosaic adapted to originate and to transmit a signal giving information of a possible target, means within said missile responsive to said signal and adapted to route said signal selectively first to a servo system and from thence directly to the controls of the missile or alternatively to a television transmitter contained within the missile and adapted to radiate said signal; a ground station adapted to receive a television image from said television transmitter, a television receiver in said control station adapted to present an image of the terrain over which the missile is flying, a kinescope associated with said television receiver, means for locating a desired target on said kinescope, a transmitter adapted to transmit intelligence concerning the location of the target received from said kinescope, and a receiver adapted to influence a selective relay system whereby upon receipt of a special signal from the transmitter in the control station, the missile will be switched from automatic control to the control of the human operator at the control station, said relay system containing means whereby upon cessation of the special signal, the relay system will return to its first-mentioned system.

14. In a control system for a guided missile of the character described, a control station, a television receiver at said control station, a kinescope having a screen upon which presentation of signal intercepted by said television receiver is visible to an operator, a transmitter at said control station adapted for receiving signal from said kinescope, means movably disposed over the screen of said kinescope for modifying signal radiated from said control station transmitter, an airborne missile having a plurality of controls for directing its flight course, a receiver at said missile adapted for intercepting signal from said control station transmitter, switch means at the output end of said receiver, a servo system including electric motors controlling the setting of said controls and responsive to signal received through said switch from said missile receiver, heat seeker means in the forward end of said missile and responsive to heat sources by initiating an electrical pulse, a remote control channel to which the electrical pulse from said heat seeker is applied, a television transmitter adapted for radiating radio signal initiated by electrical pulse at said heat seeker for interception by said television receiver at said control station and presentation upon the screen of the kinescope thereat, and an automatic control channel for simultaneously receiving the same electrical pulse from said heat seeker and for selectively applying a radio signal originated thereby to said servo system for causing the adjustment of a control upon said missile.

15. In a guided missile, an infra-red sensitive mosaic seeker, means for keeping the mosaic thereof at an extremely cold temperature, a pair of circuits dividing the output of the seeker, the first of said circuits being a television type circuit for broadcasting a television presentation of the view from the forward end of said missile, the second circuit being an automatic receiving and control circuit for the guidance of said missile, said missile guiding circuit having a pair of relays in common with the first circuit relays being arranged to be held closed so long as the missile receives a continuous radio wave of a predetermined frequency from a radio remote flight control transmitting circuit and switches the mosaic signal from the manual first circuit to the automatic second circuit to receive signal from said heat seeker and including means for translating the signals from said heat seeker into appropriate flight control settings to enable said missile to be propelled toward the source of the infra-red rays affecting the seeker.

References Cited in the file of this patent

UNITED STATES PATENTS

| | | |
|---|---|---|
| 1,388,932 | Centervall | Aug. 30, 1921 |
| 2,382,055 | Homrighous | Aug. 14, 1945 |
| 2,403,387 | McLennan | July 2, 1946 |
| 2,403,975 | Graham | July 16, 1946 |
| 2,415,059 | Zworykin | Jan. 28, 1947 |
| 2,417,112 | Kettering | Mar. 11, 1947 |
| 2,424,193 | Rost et al. | July 15, 1947 |
| 2,448,007 | Ayres | Aug. 31, 1948 |

OTHER REFERENCES

"Television Equipment for Guided Missiles," Proceedings of the I.R.E., June 1946, pp. 375 through 401.

Television, volume IV (1942–1946), published January 1947, pp. 357–368, "Flying Torpedo with an Electric Eye," by Zworykin.